Aug. 23, 1966
H. BIEHL
3,267,904
ANIMAL EXCLUDING TROUGH MEANS
Filed July 29, 1964
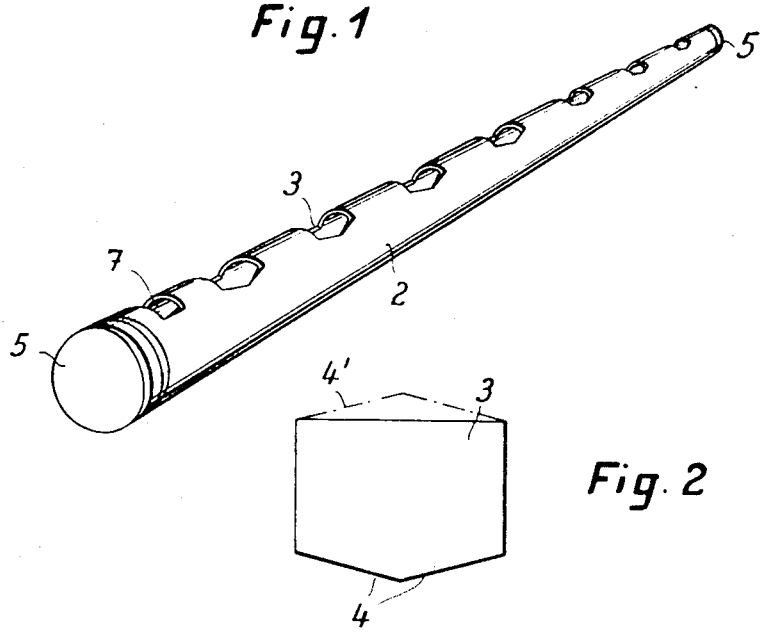
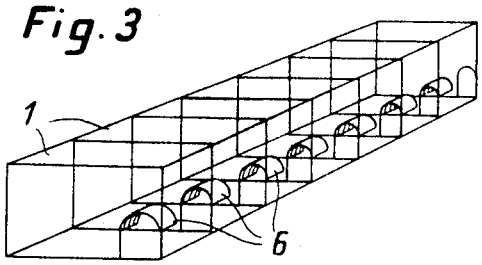
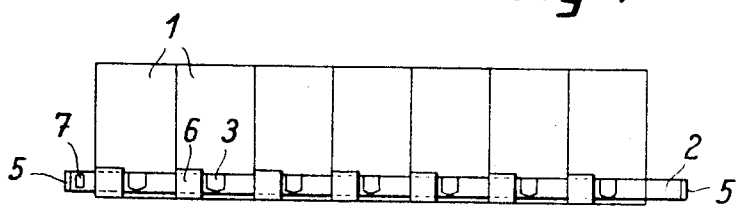
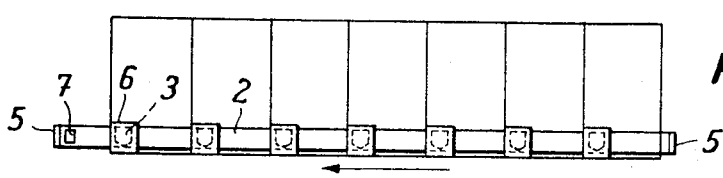
INVENTOR.
BY HEINRICH BIEHL
*Berman & Berman*
ATTORNEYS

United States Patent Office

3,267,904
Patented August 23, 1966

3,267,904
ANIMAL EXCLUDING TROUGH MEANS
Heinrich Biehl, Heinrichshof, near Trittau, Germany
Filed July 29, 1964, Ser. No. 385,968
Claims priority, application Germany, Oct. 31, 1963,
B 74,092
3 Claims. (Cl. 119—63)

The invention relates to an arrangement to rear piglets which have been weaned from the mother sow at the latest 2–4 days after their birth and kept and fed singly for a period of about 3–4 weeks in a manner to prevent infections. This arrangement consists of a battery of individual cages arranged side by side in a series and kept together by means of a common frame, the size of which being such as to each accommodate one piglet, and the bottoms of which are arranged at a space from a lower surface of erection and are provided with a plurality of openings for excrements and urine to drop into the space therebelow. Such arrangements have proved to be of good use in practice because extraordinarily good piglet rearing results may be obtained with such arrangements. It has only been recently discovered that certain problems occur when feeding the piglets because at least at the beginning such piglets of an age of 2 days to 4 weeks should be fed up to about 10 to 12 times a day with a mostly liquid feed. So far, it was provided to feed the piglets kept in such a battery of individual cages with prepared milk from bottles or chute containers or from obliquely inclined troughs continuously open towards the upper side. But it has been found that with the first method, if individual feeding containers are provided for the individual cages, the labour involved becomes hardly tolerable because these containers should also be cleaned at relatively short time intervals. Furthermore, it is known by experience that the piglets are not always eating the same amounts. However, the different feed requirements cannot be answered by the arrangement of individual containers associated with the individual cages.

With the second type, i.e. the use of the channel like upwardly opened troughs which are obliquely inclined, it is provided to have a certain amount of liquid feed, for instance milk, respectively run down the trough. The piglets are then required to eat during the time the milk is flowing past with the amount of milk intended to be such that a sufficient amount of milk is still arriving also in the lower range of the trough. It has, however, been found that the arrangement of such obliquely inclined trough continuously open towards the upper side, often is not quite satisfactory, namely first because the trough may be contaminated too easily and, secondly, because the feeding place is not exactly fixed over the width of the individual cage. It may happen that two piglets accommodated adjacent the common wall of the cages and are thus disturbing each other.

The problem on which the invention is based consists in the provision of a device by means of which the problem of feeding the piglets is solved in an excellent manner while avoiding the disadvantages indicated above.

To solve this problem the invention is characterized in that a pipe to supply liquid feed, for instance milk is arranged to extend transversely through the series of individual cages, said pipe having an upper feeding opening provided within the region of each individual cage through which opening the piglet may take feed from the pipe. With this pipe, therefore, the liquid feed, for instance, milk, is covered from above to a considerable extent; possible contaminations may reach the pipe only through the feeding openings. In addition, the feeding range for each piglet is fixed for which purpose the upper feeding opening is suitably arranged always at a point about intermediate of the width of the cage.

In an essential improvement of the invention, the pipe has associated thereto jacket portions beside the feeding openings in which the pipe and/or the jacket portions are designed in such a manner that the feeding openings may be selectively covered by the jacket portions. Thus it is possible to close the feeding openings immediately after the individual feeding operations so that during the time between the feeding operations no contaminations may reach the inside of the pipe through the feeding openings. In addition, it is possible to introduce the milk into the pipe as long as the feeding openings are still covered and then suddenly expose the feeding openings so that then all the piglets may begin to eat simultaneously and no unnecessary disturbance of the piglets not yet eating is taking place by those piglets which are already eating and vice versa. To carry this idea into practice, the pipe is arranged substantially horizontally. The closing of the feeding openings by the jacket portions may be effected in several ways. It is possible, for instance, to push the jacket portions over the feeding openings. Advantageously, however, the jacket portions are stationary and the pipe is designed to be moveable in such a manner that it may be brought into a position in which the feeding openings are covered by the jacket portions. Thus, all the feeding openings are exposed simultaneously by a movement of the pipe. On principle, two movements may be provided for the pipe, namely a rotating movement and a longitudinal movement. In a preferred embodiment of the invention, the pipe is designed to be longitudinally displaceable, and the jacket portions are arranged in a longitudinal direction beside the feeding openings of the pipe. Thus, the feeding openings are either exposed or covered by simply pushing the pipe to and fro. In this arrangement, the walls of the individual cages, through which the pipe extends are advantageously designed as bearing or guiding members for the pipe.

In a further improvement of the invention, the feeding openings of the pipe are provided with a rim bent out downwardly and longitudinally of the pipe at least of the feeding side thereof which is facing towards the piglet. Suitably, said rim is bent out downwardly in the form of an obtuse V. Thereby, the piglet is afforded some convenience when feeding (because of its snout).

In a further embodiment of the invention, the pipe is closed at its ends by plugs that may be removed for cleaning. A complete emptying and cleaning of the pipe is effected by removal of these plugs and by means of a brush adapted to the inner cross sectional configuration of the pipe, which is pulled through the pipe. The filling-in of the liquid feed is advantageously effected via a special filling opening. For this purpose the pipe is provided with a filling opening for the liquid feed at least at one end outside the battery of the cages.

For various reasons, for instance with a view to the sliding friction at the cage walls formed as pipe guides, the pipe is suitably made of plastic material. Furthermore, a pipe having a diameter of about 4.7″ has proved to be especially advantageous.

Further features and advantages of the invention are resulting from the following description of an embodiment shown by way of example in the drawings. In the drawings:

FIG. 1 shows a perspective view of a pipe used in accordance with the invention, FIG. 2 shows a diagrammatic view of the shape of a feeding opening, FIG. 3 is a diagrammatic perspective view of a battery of cages through which the pipe is extending, with the pipe not shown in the drawing, FIGS. 4 and 5 are diagrammatic top plan views taken on the battery of cages in accordance with FIG. 3 with the pipe inserted, FIG. 4 shows the feeding position and FIG. 5 shows the position in which the feeding openings are covered.

The device of which an embodiment is shown in the drawing by way of example, consists of a battery of individual cages 1, which are combined by a common frame not shown. These individual cages are big enough that they may each serve to accommodate one piglet for the time from an age of about two days until about four weeks after their birth. The individual cages possess, in a manner not shown, bottoms arranged at a space from the surface of erection and provided with a plurality of openings for excrements and urine to drop therethrough into the space therebelow.

In accordance with the present invention, a pipe 2 of circular cross section and having an inner diameter of 4.7" is arranged to extend transversely through the series of individual cages 1, said pipe having a shape as shown in FIG. 1. Corresponding to the arrangement of the individual cages, a series of feeding openings 3 are machined in the upper portion of the pipe. These feeding openings may have a configuration as shown in FIG. 2, in accordance with which they have a rim 4 bent out towards the feeding side in the form of an obtuse V. For reasons connected with the fabrication, the rim 4' opposite the rim 4 is also formed with an obtuse V-shape, as is shown in FIG. 2 in dot-dash lines.

The pipe is made of plastic material and has a length slightly in excess of the length of the battery of individual cages or the batteries of individual cages arranged side by side, respectively. For it is possible that the pipe extends for instance through 21 individual cages which may be combined to form three batteries each holding 7 cages. The end faces of the pipe 2 are closed by plugs 5 that may be removed. The complete emptying of the pipe is effected through these plugs, and cleaning is effected by means of a brush adapted to the inside pipe cross sectional configuration which is introduced into the pipe and pulled through the pipe.

The pipe extends in the forward region of the cages through openings corresponding to the periphery of the tube and formed in the walls of the cages. These openings are formed in the manner of guides for the pipe. The entire pipe is arranged in a manner to be pushed to and fro, and means may be provided to prevent rotation of the pipe, or means to fix the pipe in certain locations, respectively. The feeding openings 3 are arranged in such a manner that they are disposed at a point intermediate the width of the cage when it is intended to feed the animals. At the cage wall disposed adjacent thereto, semi-cylindrical jacket portions 6 are fastened as is shown by the drawings, under which the feeding openings 3 may be placed by displacing the tube. These jacket portions may consist of sheet metal.

At one end of the tube 2, a filling opening 7 is arranged in a region outside the battery of cages, via which the liquid feed, for instance milk or a highly fluid feed pulp may be filled into the pipe.

The pipe 2 is disposed horizontally and during the times between the individual feeding operations is in the position shown in FIG. 5, in which the feeding openings are covered by the jacket portions 6. In this position, liquid feed is filled into the pipe through the filling opening 7. The entire pipe is thereupon displaced in such a manner that the feeding openings 3 are freely accessible to the piglets. It is, however, also possible under certain circumstances, to displace the pipe at first and then fill it. After the piglets have had their meal or on expiration of a predetermined feeding time, respectively, the pipe will be moved backwards again, and the feeding openings are covered by the jacket portions 6, so that during this time the pipe cannot be contaminated by the piglets.

The work connected with the feeding may still be simplified if the feed for the piglets consists of thick curdled skim milk (with additives). This thick curdled skim milk has reached a chemical condition which will not change for at least 24 hours, probably 48 hours, and therefore need be filled into the feeding pipe only once a day. With the device in accordance with the invention it is possible to effect a metering of a certain amount of feed at short intervals of time, for instance every hour, in that the feeding pipe from which the piglet takes it feed is exposed to the piglet for a certain amount of time every hour. This may be effected either in that when using jacket portions, the pipe or the said jacket portions, respectively, are moved in such a manner that the feeding openings are exposed to the animal or in that such a feeding pipe is moved downwardly and at the same time forwardly so that the animals can no longer reach the feeding openings and the feed cannot be contaminated through the feeding openings. In the same manner also these piglets may be fed which are to be fed with a special PS feed for a further period of 28 days after the 28th day in the single cages while they have been kept so far in groups of ten animals.

In the case of cage batteries consisting of two rows of single cages arranged with their backs adjacent each other, it is also possible to arrange a common feeding pipe 2 for the two rows of cages within the region of the common back wall. In this arrangement, common openings may likewise be provided as feeding openings 3 for two respective cages or separate openings disposed adjacent each other may be provided so that the piglets are not disturbing each other when feeding. In the latter case, as is also illustrated in the embodiment shown in the drawings, the feeding openings are suitably arranged with a slope towards the feeding side so that they are not accessible from the other side.

The device in accordance with the invention lends itself excellently to carry out a method to prevent the infection of piglets by the mother sow, in accordance with which the piglets are weaned and separated from the mother sow a few days after their birth and are kept and fed separate from one another until they have reached an age of several weeks, whereupon keeping and feeding to be carried out in a manner known per se is started. By the application of such a rearing method extraordinarily healthy animals which have a good appetite and are growing well are the result, for which reason such a method and arrangement to carry out such a method must be allotted utmost importance.

What I claim is:

1. Apparatus for rearing and feeding piglets weaned away from the mother sow comprising, in combination, a series of cages in side-by-side relationship, each cage adapted to accommodate a piglet, said cages each including opposed side walls and the side walls of said series of cages being in spaced relationship, a fixed cover member within each of said cages, said cover members of the cages constituting said series being in longitudinal alignment, said cage side walls each being open at the portion thereof in alignment with said cover members, an elongated feed trough having closed upper portions inserted through said cages and below said cover members and longitudinally movable with respect thereto, said trough having closed ends and being of a length greater than the total length of said series of cages, a plurality of openings defined in the trough upper portion between said closed portions and axially spaced along the length of said trough, the axial spacing between adjacent openings corresponding to the spacing between adjacent cover members whereby said feed trough may be axially moved to a first position relative to said cover members locating said openings under a respective cover member within each cage and thereby preventing access to said openings by the piglets within said cages, axial shifting of said feed trough to a second axial position removing said openings from under said cover members and providing access to the interior of said feed trough through said openings.

2. An apparatus for rearing and feeding piglets as in claim 1 wherein said feed trough comprises a hollow cylindrical tube having closed ends, and said cover members including an arcuate portion closely corresponding to the configuration of said tube whereby at said first position of said tube said cover members closely conform to and enclose said openings.

3. Apparatus for rearing and feeding piglets as in claim 1 wherein a feed inlet opening is defined in said feed trough upper portion adjacent an end thereof.

References Cited by the Examiner

UNITED STATES PATENTS

| 869,088 | 10/1907 | Hurst | 119—72 |
| 1,057,490 | 4/1913 | Moren | 119—63 |
| 2,661,800 | 12/1953 | Reichenbach | 119—18 |
| 2,881,733 | 4/1959 | Young et al. | 119—15 |

FOREIGN PATENTS 3,450  1915  Great Britain.

SAMUEL KOREN, *Primary Examiner.*
HUGH R. CHAMBLEE, *Examiner.*